No. 642,476. Patented Jan. 30, 1900.
W. McCOY.
TRAP.
(Application filed Sept. 21, 1899.)
(No Model.)
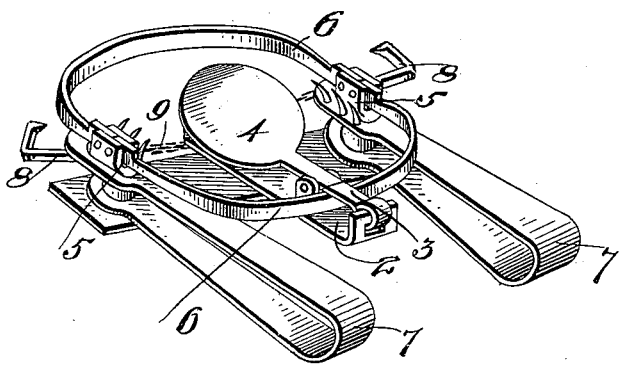
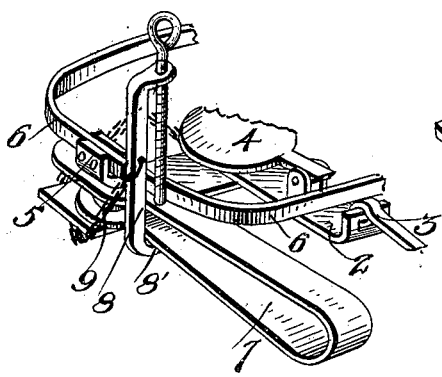
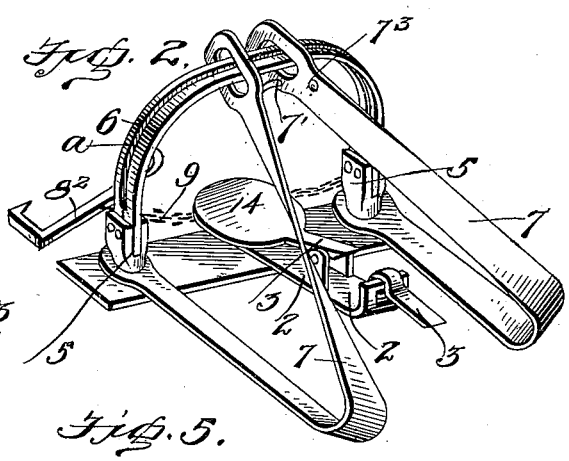
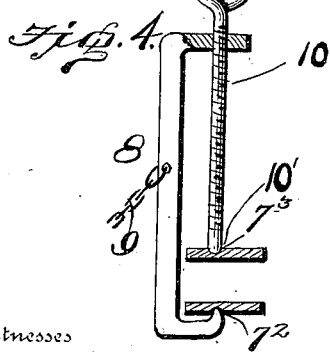
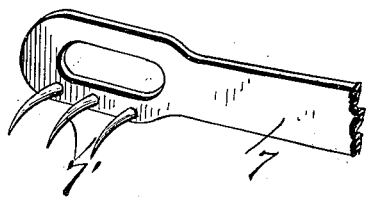
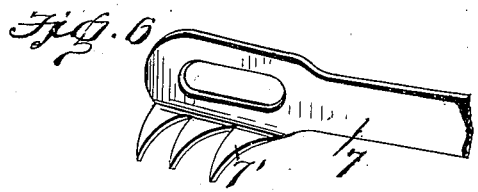
Witnesses
Inventor
Wm. McCoy
by H. B. Willson & Co.
Attorneys
THE NORRIS PETERS CO., PHOTO-LITHO., WASHINGTON, D. C.

UNITED STATES PATENT OFFICE.

WILLIAM McCOY, OF WARREN, ARKANSAS.

TRAP.

SPECIFICATION forming part of Letters Patent No. 642,476, dated January 30, 1900.

Application filed September 21, 1899. Serial No. 731,242. (No model.)

*To all whom it may concern:*

Be it known that I, WILLIAM MCCOY, a citizen of the United States, residing at Warren, in the county of Bradley and State of Arkansas, have invented certain new and useful Improvements in Traps; and I do declare the following to be a full, clear, and exact description of the invention, such as will enable others skilled in the art to which it appertains to make and use the same.

My invention relates to improvements in animal-traps; and the object is to improve the construction and increase the efficiency of the trap.

To this end the invention consists in certain features of construction and combination of parts, which will be hereinafter more fully described and claimed.

In the accompanying drawings the same reference characters indicate the same parts of the invention.

Figure 1 is a perspective view of my improved animal-trap as it appears when set. Fig. 2 is a similar view of the trap sprung. Fig. 3 is a detail view to illustrate the manner of setting the trap. Fig. 4 is a section through the clamp as it appears when employed to compress the springs. Fig. 5 is a detail perspective view of the free end of one of the springs. Fig. 6 shows another form of the teeth.

1 denotes the base-bar, to which the bracket 2 is fixed. The outer end of this bracket is turned vertically upward to form a support for the trigger 3, which engages the usual bait-platform 4.

5 5 denote bifurcated standards fixed to the outer ends of the base-bar 1 and in which the usual jaws 6 6 are hinged.

7 7 denote the counterpart springs, which close the jaws. The lower ends of the springs encompass the standards, and their free ends encompass the jaws. The lower edges of the free ends of the springs are provided with curved prongs or teeth 7' 7', which intermesh when the trap is sprung, and thus assist the jaws in securing the game. The bottom face of the fixed end of each spring is formed with a countersunk recess $7^2$ and the upper face of the free end with a similar recess $7^3$, so that when it is desired to set the trap the clamps 8 8, which are attached to any convenient part of the trap proper by a short chain 9, are adjusted to the springs by inserting the toes 8' in the recess $7^2$ and the center-point end 10' of the thumb-screws 10 in the recess $7^3$, and by a proper manipulation of the screws the springs are compressed to permit the jaws to be opened and held in the set position by the trigger. The clamps are now detached, and the trap is ready to receive the game.

While I have shown the springs provided with three teeth as the medium number, only two will be required on small traps, such as are used for coon and otter; but for larger traps for beaver and bear more teeth or spikes will be required in proportion to the size of the trap and game.

It will be noticed that the meeting edges of the jaws are cut away to leave a slot $a$ between them when closed, as shown in Fig. 2, so that the leg or foot bones of the animal will not be crushed. The jaws being sharp oval around, the springs press continuously to the center, the curved teeth pulling the animal's foot downward as the free ends of the springs come nearer together.

The construction of the trap is such that it will catch in the paw below the wrist-joint. The teeth on the under side of the free ends of the springs strike into the foot or paw before the jaws come to a close, and being sharp and curved downwardly they penetrate the foot and pull it down toward the center of the trap.

Should the animal gnaw off its foot up to the spike, there is still meat enough above the spikes to hold, and the leg-bone above the trap not being broken by the jaws he cannot and will not gnaw off his leg above the jaws, nor can he pull it out of the trap.

The accompanying drawings show my invention in the best form now known to me; but many changes in the details might be made within the skill of a good mechanic without departing from the spirit of my invention as set forth in the claim at the end of this specification.

Having thus fully described the invention, what is claimed, and desired to be secured by Letters Patent of the United States, is—

The combination with the jaws and trigger mechanism, of the springs 7 7 having their free ends formed with the prongs 7' 7', substantially as shown and described.

In testimony whereof I have hereunto set my hand in presence of two subscribing witnesses.

WILLIAM $\overset{\text{his}}{\times}$ McCOY.
$\phantom{WILLIAM \times}{}_{\text{mark}}$ Witnesses:
T. J. BRATTON,
I. E. WALKER.